(12) United States Patent
Apichom

(10) Patent No.: US 6,457,421 B1
(45) Date of Patent: Oct. 1, 2002

(54) TRAY ADAPTED FOR MOUNTING UPON A STEERING WHEEL

(76) Inventor: Surasak Apichom, 2125 Ohio Ave., #G, Signal Hill, CA (US) 90804

( * ) Notice: Subject to any disclaimer, the term of this patent is extended or adjusted under 35 U.S.C. 154(b) by 0 days.

(21) Appl. No.: 09/864,540

(22) Filed: May 23, 2001

(51) Int. Cl.$^7$ .............................................. A47B 23/00
(52) U.S. Cl. ...................................................... 108/44
(58) Field of Search ............................ 100/44, 45, 25, 100/26; 224/226; 108/165, 42

(56) References Cited

U.S. PATENT DOCUMENTS

| | | | |
|---|---|---|---|
| 2,211,962 A | | 8/1940 | Morris |
| 2,770,513 A | * | 11/1956 | Brown |
| 3,499,595 A | * | 3/1970 | Brooks |
| 4,287,621 A | | 9/1981 | Kertz |
| 4,974,805 A | * | 12/1990 | Douglas |
| 4,995,637 A | * | 2/1991 | Muraishi |
| 5,060,581 A | | 10/1991 | Malinski ..................... 108/44 |
| 5,069,375 A | | 12/1991 | Flick |
| 5,177,665 A | * | 1/1993 | Frank et al. |
| 5,386,785 A | | 2/1995 | Naor ............................ 108/44 |
| 5,413,035 A | | 5/1995 | Fernandez |
| D365,219 S | | 12/1995 | Tange |
| 5,487,521 A | | 1/1996 | Callahan ................... 108/44 X |
| 5,558,026 A | | 9/1996 | Seibert ........................ 108/44 |
| D393,237 S | | 4/1998 | Mondo, Jr. |
| 5,749,306 A | * | 5/1998 | Breuner |
| 5,845,585 A | | 12/1998 | Meeus et al. ................. 108/44 |
| 6,038,983 A | * | 3/2000 | Lendl |
| 6,192,806 B1 | * | 2/2001 | Chen |

FOREIGN PATENT DOCUMENTS

| | | | |
|---|---|---|---|
| JP | 7-205701 | * | 8/1995 |
| WO | WO 96/18520 | | 6/1996 |

* cited by examiner

*Primary Examiner*—Jose V. Chen
(74) *Attorney, Agent, or Firm*—Eric Karich

(57) ABSTRACT

A tray adapted for mounting upon a steering wheel has a base panel, a pair of side panels, and a steering wheel attachment panel. A panel tab of each of the pair of side panels is shaped to removably engage one of a pair of side panel receiving slots of the steering wheel attachment panel to lock each of the pair of side panels in an upwardly extending configuration and the steering wheel attachment panel in an angled configuration. A steering wheel attachment tab extends upwardly from the steering wheel attachment panel, the steering wheel attachment tab being adapted to wrap around a top portion of the steering wheel to removably engage a steering wheel attachment slot of the steering wheel attachment panel to lock the steering wheel attachment tab in a locked configuration around the top portion, thereby suspending the tray from the steering wheel.

5 Claims, 3 Drawing Sheets

TRAY ADAPTED FOR MOUNTING UPON A STEERING WHEEL

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to trays, and more particularly to a tray adapted for mounting upon a steering wheel of a motor vehicle.

2. Description of Related Art

The following art defines the present state of this field: Naor, U.S. Pat. No. 5,386,785, teaches a combined support section and an article-support panel for use in conjunction with a vehicle steering wheel. The support section is shaped to detachably mount on the steering wheel to pivotally affix the article-support panel. Additionally, the steering wheel support section also provides the article-support panel with an underside gusseted angle bracing arrangement having an angular adjustment arrangement. Moreover, located above the article-support panel and integrally provided on the top panel of the support section, receptacles are provided for bindingly engaging reading material such as a newspaper, book, a magazine or the like. The article-support panel defines a working surface to hold a meal, writing material, a lap top computer or other things that are used in a car.

Meeus et al., U.S. Pat. No. 5,845,585, teaches a supporting tray adapted for mounting n the steering wheel of a vehicle. The supporting tray includes a rigid panel with two parallel folding lines so as to divide the panel in three parts, namely a first central part, a second part with an opening and a third part, the opening being adapted for being moved downwards so that the wheel partly passes through the opening and so that edges of the opening are supported by the wheel. The supporting tray further includes a link for linking the third part and the first part together so as to maintain the third part substantially horizontal.

Malinski, U.S. Pat. No. 5,060,581, teaches a foldable wheel mounted tray apparatus of inexpensive construction permitting the automobile driver to comfortably dine while seated behind the steering wheel. The tray apparatus provides a tray surface on which to dispose food and to prop reading material in an upright position. Adjustments are provided for accommodating the tray to the angular orientation between the steering wheel column and the horizontal, the tilt angle, as differs between various models of automobiles, to maintain the tray level. The tray is pivotally mounted along a longitudinal edge to a back panel that in turn is supported on the steering wheel. Straps extending from the back panel to the tray suspend the opposed end of the tray maintaining same to a level position. Angular adjustment is achieved by changing the length of restraining straps. A brass brad is inserted through slits in the strap to bunch together a portion of the strap's end thereby adjusting the length of the remainder of the strap.

Flick, U.S. Pat. No. 5,069,375, teaches a food support tray that is intended to be secured while resting on the lap of an occupant of a motor vehicle. The tray has a fastener which detachably secures it on the lap of the occupant. Preferably, the fastener is a clip which secures the tray to the seat belt of the vehicle when the seat belt is fastened about the occupant. The tray is generally planar with longitudinal forward and rear edges and opposite and shorter end edges. The rear edge is arcuately bowed inwardly, contouring to the waist of the occupant. The forward edge can also be bowed inwardly at a central location to provide clearance for the steering wheel, thus permitting its use by the driver of a vehicle. The tray has vertically walled recesses on its upper surface, preferably at least one is provided for reception of a beverage cup.

R. S. Morris, U.S. Pat. No. 2,211,962, teaches a tray that can be readily attached to the steering wheel of the automobile and supported thereon in convenient reach of the driver so that he may be served individually and to eliminate the necessity of his reaching to the tray that is usually hung from the side of the card adjacent the door or window.

Callahan, U.S. Pat. No. 5,487,521, teaches a mounting assembly for ergonomically supporting a small portable computer, expanded computer keyboard, printed mater, food and/or beverage. The assembly is comprised of two pieces: an upper clipboard which releasably attaches to a steering wheel and which is also attached to an angularly adjustable tray. Both the clipboard and the tray have ledges on their respective lower extremities for holding large freestanding printed matter. The clipboard has a clip on its uppermost surface for holding small printed books. The tray holds food and/or beverage when in a horizontal position as well as serving as a small desk for writing in longhand. The assembly nests flat for storage and shipping.

Fernandez, U.S. Pat. No. 5,413,035, teaches a tray supported on a steering wheel of a motor vehicle which consists of a back panel, with a base panel secured along one inner edge to a lower edge of the back panel. A structure is for attaching in a removable manner, the back panel to the steering wheel. The base panel will generally extend horizontally and outwardly therefrom, to allow a person sitting on a seat in the motor vehicle to eat off and work upon the base panel.

Seibert, U.S. Pat. No. 5,558,026, teaches a motor vehicle tray adapted for mounting on a steering wheel of a motor vehicle including a support panel for supporting an article thereon and a main body panel connected to the support panel for suspending the support panel outwardly from the steering wheel at an angle relative thereto. Side panels, which extend outwardly from the main body panel, are releasably attached to the support panel in such a manner as to permit the angle between the support panel and the steering wheel to be adjustable.

Mondo, Jr., U.S. Des. Pat. No. 393,237, teaches an ornamental design for a demountable automobile steering wheel portable computer platform.

Kertz, U.S. Pat. No. 4,287,621, teaches a steering wheel attachment which has a foam cushion pad with a cylindrical outer surface, upper and lower flat parallel surfaces, and a linear diameter surface dimensioned to overlie the upper half of a steering wheel with a cover enclosing the pad and a pocket panel on the back of the cover matingly fitting over the steering wheel to hold the pad in position to permit a user to rest head and arms on the pad; a rigid stiffener panel inside to cover prevents actuation of the horn button of the steering wheel to which the pad is attached.

Tange, U.S. Des. Pat. No. 365,219, teaches an ornamental design for a desk for a vehicle steering wheel.

Lendl, WO 96/18520, teaches a table arrangement for mounting on the steering wheel of a motor vehicle with a table top and a container-shaped bottom part, as well as adjusting means for determining the angular position of the table top in relation to the bottom part. The table arrangement may be hooked on the steering wheel by anchoring means that allow the table to slide towards the driver.

The above-described prior art, hereby incorporated by reference, teaches various trays that can be attached to a steering wheel of a vehicle for holding computers, food, and the like.

However, the prior art does not teach a tray having the unique construction of the present invention, including the easy to use steering wheel attachment tab, and the inexpensive to manufacture, ship and store construction of the pair of side panels with their panels tabs. The present invention fulfills these needs and provides further related advantages as described in the following summary.

SUMMARY OF THE INVENTION

The present invention teaches certain benefits in construction and use which give rise to the objectives described below.

The present invention provides a tray adapted for mounting upon a steering wheel of a motor vehicle. The tray includes a base panel, a pair of side panels, and a steering wheel attachment panel. A panel tab of each of the pair of side panels is shaped to removably engage one of a pair of side panel receiving slots of the steering wheel attachment panel to lock each of the pair of side panels in an upwardly extending configuration and the steering wheel attachment panel in an angled configuration. A steering wheel attachment tab extends upwardly from the steering wheel attachment panel, the steering wheel attachment tab being adapted to wrap around a top portion of the steering wheel to removably engage a steering wheel attachment slot of the steering wheel attachment panel to lock the steering wheel attachment tab in a locked configuration around the top portion, thereby suspending the tray from the steering wheel.

A primary objective of the present invention is to provide provides a tray adapted for mounting upon a steering wheel of a motor vehicle, the tray having advantages not taught by the prior art.

Another objective is to provide a tray that can quickly and easily be attached to and removed from the steering wheel.

A further objective is to provide a tray that is inexpensive to manufacture and can be shipped and stored in a configuration that requires very little storage space.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
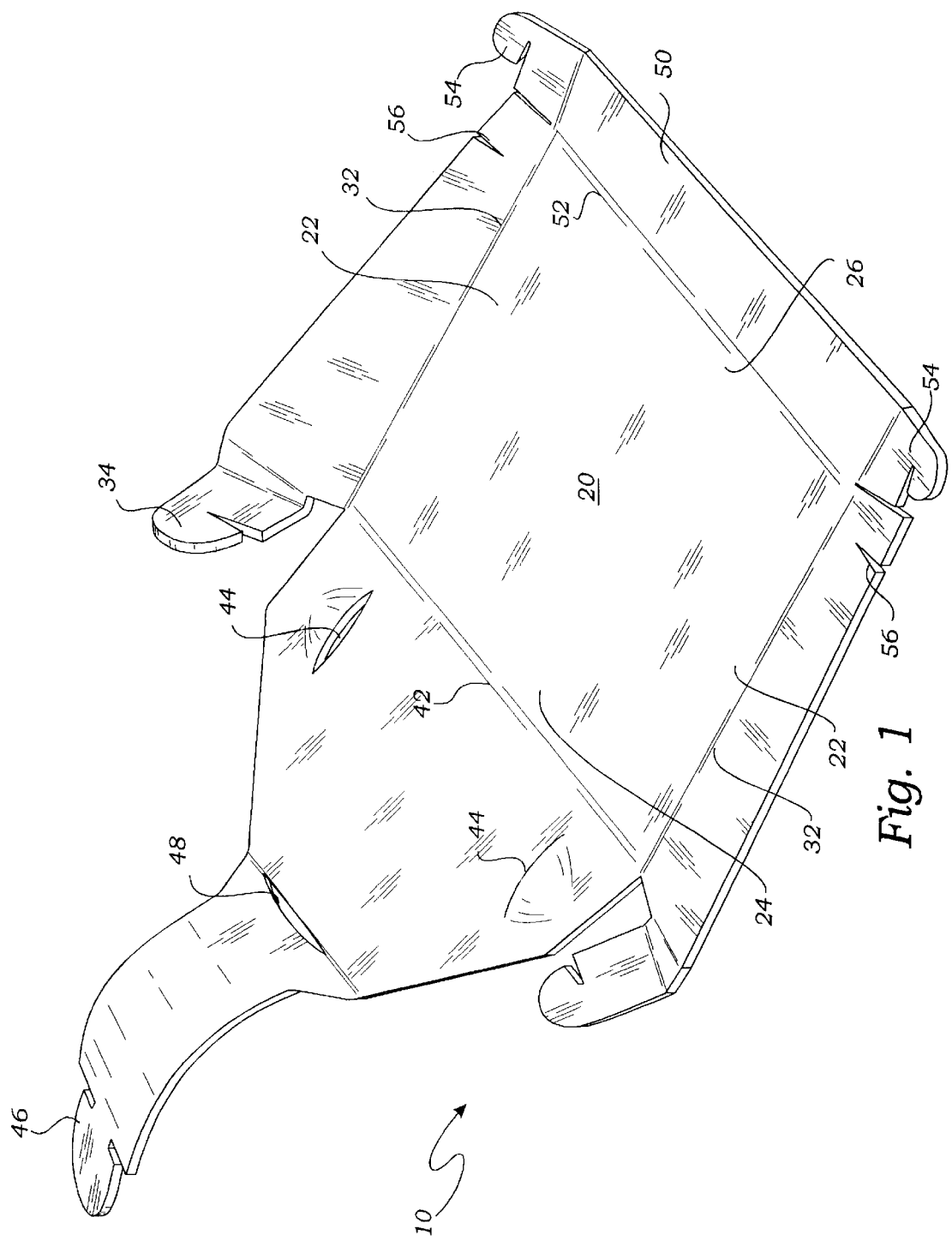
FIG. 1 is a perspective view of the preferred embodiment of the present invention, the invention being positioned in an unfolded configuration.

The above described drawing figures illustrate the invention, a tray 10 adapted for mounting upon a steering wheel 12 of a motor vehicle. The tray 10 includes a base panel 20 having a pair of side panels 30, each of the pair of side panels 30 being integral with the base panel 20 and positioned on opposing sides 22 of the base panel 20. Each of the pair of side panels 30 folds along a side panel crease 32 between a flat configuration and an upwardly extending configuration. A steering wheel attachment panel 40, integral with a top portion 14 of the base panel 20 and positioned between the pair of side panels 30, folds along an attachment panel crease 42 between a horizontal configuration and an angled configuration. A panel tab 34 of each of the pair of side panels 30 is shaped to removably engage one of a pair of side panel receiving slots 44 of the steering wheel attachment panel 40 to lock each of the pair of side panels 30 in the upwardly extending configuration and the steering wheel attachment panel 40 in the angled configuration. A steering wheel attachment tab 46 extends upwardly from the steering wheel attachment panel 40. The steering wheel attachment tab 46 is adapted to be wrapped around the top portion 14 of the steering wheel 12 and shaped to removably engage a steering wheel attachment slot 48 of the steering wheel attachment panel 40 to lock the steering wheel attachment tab 46 in a locked configuration around the top portion 14 of the steering wheel 12, thereby suspending the tray 10 from the steering wheel 12.

In the preferred embodiment, the tray 10 further includes a bottom panel 50 that is integral with a bottom portion 26 of the base panel 20 opposite the top portion 14 and positioned between the pair of side panels 30. The bottom panel 50 folds along a bottom panel crease 52 between a first configuration and a second configuration. A pair of bottom tabs 54 extend from the bottom panel 50, each of the pair of bottom tabs 54 being shaped to removably engage a base locking slot 56 of one of the pair of side panels 30 to lock the bottom panel 50 in the second configuration.

The tray 10 is preferably constructed from a single flexible sheet such as paper, corrugated cardboard, or corrugated, flexible plastic. The sheet is cut to form the base panel 20 having the pair of side panels 30 on opposing sides 22 of the base panel 20. The base panel 20 is further cut to have the steering wheel attachment panel 40 positioned between the pair of side panels 30. The pair of side panel receiving slots 44 are cut in the steering wheel attachment panel 40 and the panel tab 34 is cut in each of the pair of side panels 30, the panel tab 34 of each of the pair of side panels 30 being shaped to removably engage one of the pair of side panel receiving slots 44 of the steering wheel attachment panel 40. The steering wheel attachment slot 48 is cut in the steering wheel attachment panel 40 and the steering wheel attachment tab 46 is cut in the steering wheel attachment panel 40, the steering wheel attachment tab 46 being shaped to removably engage the steering wheel attachment slot 48 of the steering wheel attachment panel 40. All of these cuts are preferably made simultaneously using a die or a computer controlled cutting mechanism, as is well known in the art.

The pair of side panel creases 32 are preferably also formed in the tray 10, each of the pair of side panel creases 32 being formed between the base panel 20 and one of the pair of side panels 30. The pair of side panel creases 32 facilitate the proper folding of the pair of sidewalls when the tray 10 is in use. Furthermore, the attachment panel crease 42 is formed between the base panel 20 and the steering wheel attachment panel 40 to facilitate folding of the steering wheel attachment panel 40, as described above. The pair of side panel creases 32 and the attachment panel crease 42 are formed by perforations or partial cuts formed by the die described above, or by pre-folding the pair of sidewalls and the steering wheel attachment panel 40, typically using a computer controlled folding device. Such cutting and folding techniques are well known in the art and therefore do not warrant a more detailed description.

In the preferred embodiment, the die also cuts the bottom panel 50 opposite the top portion 14, between the pair of side panels 30, and forms the bottom panel crease 52. The bottom panel 50 is preferably cut to have the pair of bottom tabs 54 extend from the bottom panel 50, each of the pair of bottom tabs 54 being shaped to removably engage the base locking slot 56 cut in each of the pair of side panels 30. The bottom panel 50 not only functions to hold items on the base panel 20, it also serves to strengthen the base panel 20 of the tray 10 and stabilize the pair of side panels 30 when they are folded to the upwardly extending configuration.

The invention further includes a method for mounting the tray 10 upon a top portion 14 of the steering wheel 12. The tray 10 described above is provided, typically as a stack of the trays 10 in an unfolded configuration, as shown in FIG. 1, in which the steering wheel attachment panel 40 is in the horizontal configuration, each of the pair of side panels 30 is in the flat configuration, and the bottom panel 50 is in the first configuration. It is possible to mass produce the tray 10 using the die described above, and simple and inexpensive to ship and store large quantities of the tray 10.

Figure 2:
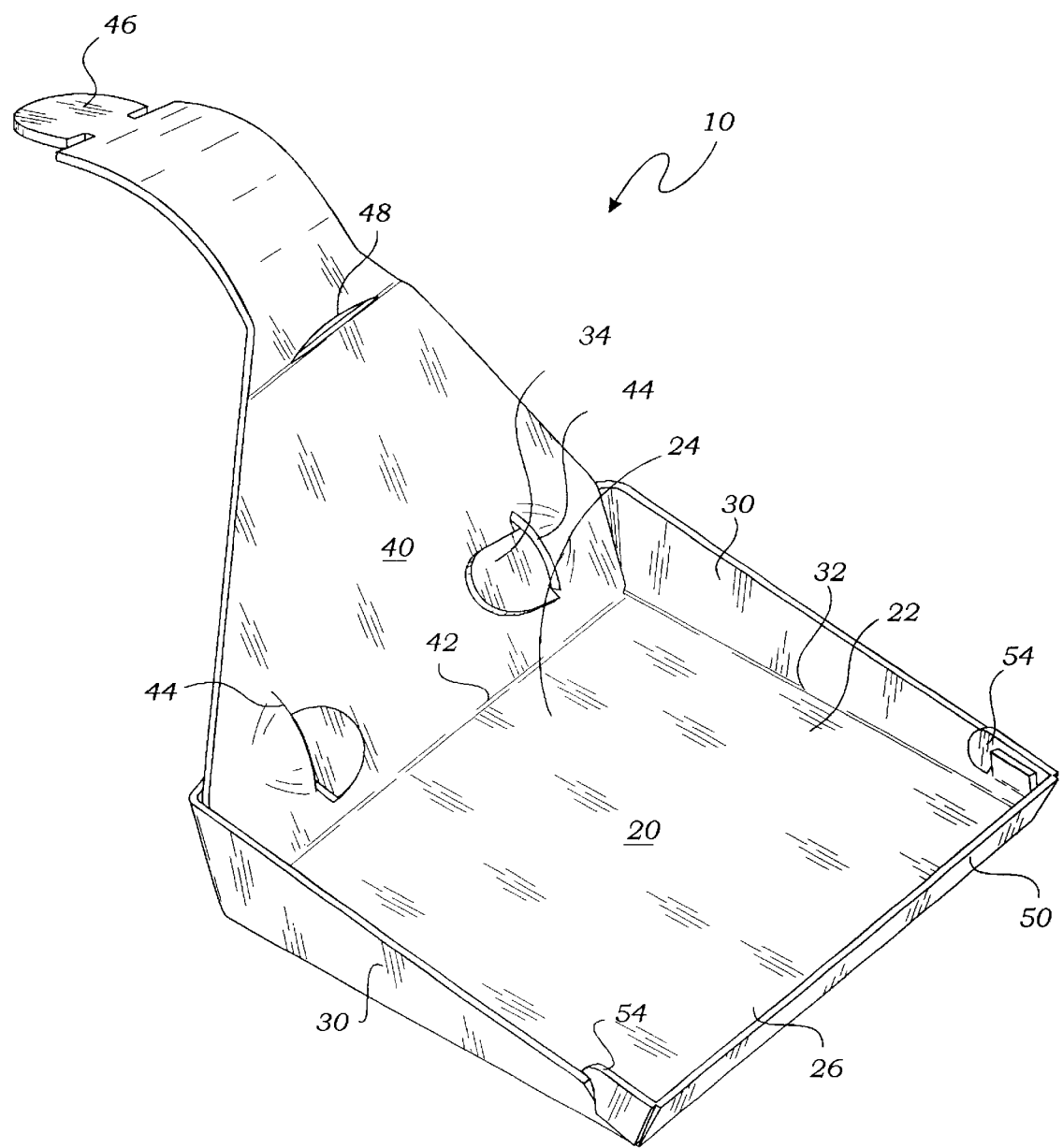
FIG. 2 is a perspective view of the invention in a folded configuration.

When ready for use, typically by a consumer of fast food who intends to eat the fast food in his or her motor vehicle, the tray 10 is folded from the unfolded configuration to a folded configuration. In the folded configuration, as shown in FIG. 2, the steering wheel attachment panel 40 is folded from the horizontal configuration to the angled configuration, each of the pair of side panels 30 is folded from the flat configuration to the upwardly extending configuration, and the bottom panel 50 is folded from the first configuration to the second configuration. Each of the pair of side panels 30 is attached to the steering wheel attachment panel 40, thereby locking each of the pair of side panels 30 in the upwardly extending configuration and the steering wheel attachment panel 40 in the angled configuration. When the steering wheel attachment panel 40 is in the angled configuration, it is preferably not perpendicular to the base panel 20, but positioned at an obtuse angle that is approximately equal to the angle of the steering wheel 12. By properly angling the steering wheel attachment panel 40 with respect to the base panel 20, the contact of the steering wheel attachment panel 40 with the steering wheel 12 supports the base panel 20 horizontal to the ground so that items can be placed on the tray 10 without sliding off the tray 10.

Figure 3:
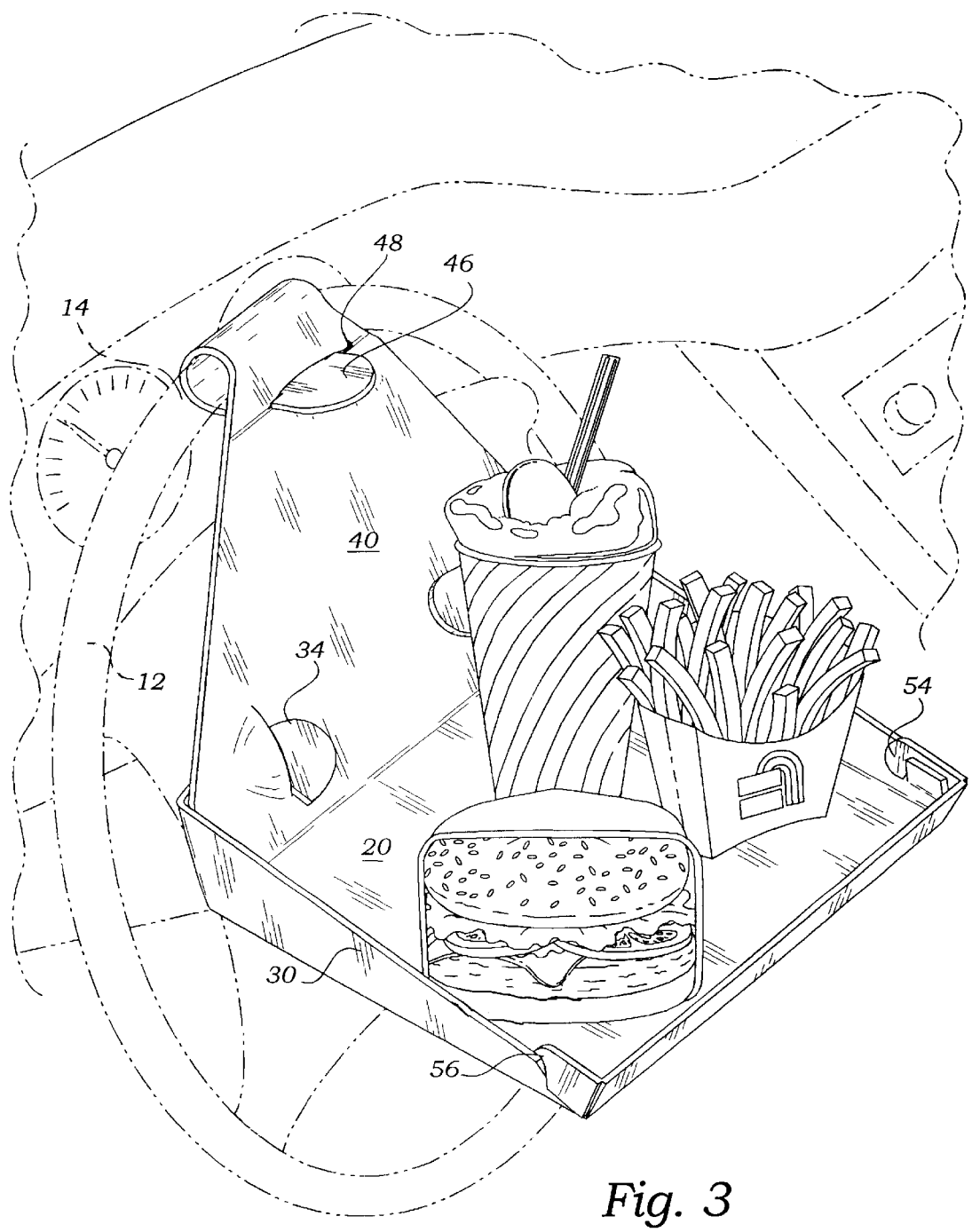
FIG. 3 is a perspective view of the invention attached to a steering wheel and operably positioned for use.

As shown in FIG. 3, once the tray 10 has been folded to the folded configuration, the steering wheel attachment tab 46 is wrapped around the top portion 14 of the steering wheel 12 inserted into the steering wheel attachment slot 48, thereby locking the steering wheel attachment tab 46 in a locked configuration around the top portion 14 of the steering wheel 12 and suspending the tray 10 from the steering wheel 12. In this position, the base panel 20 is positioned to support food or other items in a position convenient to a person seated behind the steering wheel 12.

Those skilled in the art will recognize that many components of the tray 10 described above can be modified with equivalent components or equivalent arrangement without avoiding the scope of the claims that follow. Specifically, each of the tabs and their mating slots can be reversed, and the mere reversal of these elements should be considered equivalent to the present description. Furthermore, while the tabs and slots described above are preferred, equivalent attachment mechanisms can be used in the method of using the tray 10. The various panels can be interconnected using hooks and loops such as VELCRO®, adhesives, or other equivalent attachment mechanisms.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A tray adapted for mounting upon a steering wheel, the steering wheel having a top portion, the tray comprising:
   a base panel having a pair of side panels, each of the pair of side panels being integral with the base panel and positioned on opposing sides of the base panel, each of the pair of side panels folding along a side panel crease between a flat configuration and an upwardly extending configuration;
   a steering wheel attachment panel that is integral with a top portion of the base panel and positioned between the pair of side panels, the steering wheel attachment panel folding along an attachment panel crease between a horizontal configuration and an angled configuration;
   a panel tab of each of the pair of side panels shaped to removably engage one of a pair of side panel receiving slots of the steering wheel attachment panel to lock each of the pair of side panels in the upwardly extending configuration and the steering wheel attachment panel in the angled configuration; and
   a steering wheel attachment tab extending upwardly from the steering wheel attachment panel, the steering wheel attachment tab being adapted to be wrapped around the top portion of the steering wheel and shaped to removably engage a steering wheel attachment slot of the steering wheel attachment panel to lock the steering wheel attachment tab in a locked configuration around the top portion of the steering wheel, thereby suspending the tray from the steering wheel.

2. The tray of claim 1 further comprising a bottom panel that is integral with a bottom portion of the base panel opposite the top portion and positioned between the pair of side panels, the bottom panel folding along a bottom panel crease between a first configuration and a second configuration; and
   a pair of bottom tabs of the bottom panel shaped to removably engage a base locking slot of each of the pair of side panels to lock the bottom panel in the second configuration.

3. The tray of claim 1 wherein the tray is constructed of a single flexible sheet.

4. A method for manufacturing a tray adapted for mounting upon a steering wheel, the method comprising the steps of:
   a) providing a sheet;
   b) cutting the sheet to form a base panel having a pair of side panels on opposing sides of the base panel, the base panel being further cut to have a steering-wheel attachment panel positioned between the pair of side panels;
   c) cutting a pair of side panel receiving slots in the steering wheel attachment panel;
   d) cutting a panel tab in each of the pair of side panels, the panel tab of each of the pair of side panels being shaped to removably engage one of the pair of side panel receiving slots of the steering wheel attachment panel;

e) cutting a steering wheel attachment slot in the steering wheel attachment panel;

f) cutting a steering wheel attachment tab in the steering wheel attachment panel, the steering wheel attachment tab being shaped to removably engage the steering wheel attachment slot of the steering wheel attachment panel;

g) forming a pair of side panel creases, each of the pair of side panel creases being formed between the base panel and one of the pair of side panels; and h) forming an attachment panel crease between the base panel and the steering wheel attachment panel.

5. A method for mounting a tray upon a top portion of a steering wheel, the method comprising the steps of:

a) providing a tray comprising:
 a base panel having a pair of side panels, each of the pair of side panels being positioned on opposing sides of the base panel, each of the pair of side panels folding along a side panel crease between a flat configuration and an upwardly extending configuration;
 a steering wheel attachment panel extending from a top portion of the base panel between the pair of side panels, the steering wheel attachment panel folding along an attachment panel crease between a horizontal configuration and an angled configuration, the steering wheel attachment panel having a steering wheel attachment slot; and
 a steering wheel attachment tab extending upwardly from the steering wheel attachment panel;

b) folding the steering wheel attachment panel from the horizontal configuration to the angled configuration;

c) folding each of the pair of side panels from the flat configuration to the upwardly extending configuration;

d) attaching each of the pair of side panels to the steering wheel attachment panel, thereby locking each of the pair of side panels in the upwardly extending configuration and the steering wheel attachment panel in the angled configuration;

e) wrapping the steering wheel attachment tab around the top portion of the steering wheel; and f) inserting the steering wheel attachment tab into the steering wheel attachment slot, thereby locking the steering wheel attachment tab in a locked configuration around the top portion of the steering wheel and suspending the tray from the steering wheel.

* * * * *